United States Patent
Chung et al.

(10) Patent No.: US 10,057,541 B2
(45) Date of Patent: Aug. 21, 2018

(54) IMAGE-CAPTURING AND DISPLAY APPARATUS AND PHOTOGRAPHING METHOD USING THE SAME

(75) Inventors: Jin-Koo Chung, Yongin (KR); Chan-Young Park, Yongin (KR); Jun-Ho Choi, Yongin (KR); Joo-Hyeon Lee, Yongin (KR); Seong-Min Kim, Yongin (KR); Sang-Moo Choi, Yongin (KR)

(73) Assignee: Samsung Display Co., Ltd., Yongin-si (KR)

(*) Notice: Subject to any disclaimer, the term of this patent is extended or adjusted under 35 U.S.C. 154(b) by 827 days.

(21) Appl. No.: 13/102,744

(22) Filed: May 6, 2011

(65) Prior Publication Data
US 2012/0162490 A1 Jun. 28, 2012

(30) Foreign Application Priority Data
Dec. 23, 2010 (KR) .................. 10-2010-0133712

(51) Int. Cl.
*H04N 5/222* (2006.01)
*H04N 7/14* (2006.01)
(Continued)

(52) U.S. Cl.
CPC ............ *H04N 7/144* (2013.01); *H04N 5/232* (2013.01); *H04N 5/3765* (2013.01)

(58) Field of Classification Search
CPC ............ G09G 2300/023; G09G 3/003; G09G 3/3406; G02F 1/133555; H04N 5/232; H04N 7/144; H04N 5/3765
(Continued)

(56) References Cited

U.S. PATENT DOCUMENTS 5,340,978 A * 8/1994 Rostoker ........... H01L 27/14625
250/208.1
5,760,834 A * 6/1998 Rostoker ........... H01L 27/14618
257/E27.134
(Continued)

FOREIGN PATENT DOCUMENTS

JP 06-078301 A 3/1994
JP 6007830 B2 10/2016
(Continued)

OTHER PUBLICATIONS

Baek-Woon Lee et al.. 51.1:Novel Simultaneous Emission Driving Scheme for Crosstalk-free 3D AMOLED TV, May 8, 2010, XP55023291, retrieved from the Internet: URL:http://i.cmpnet.com/eetimes/51-1.pdf. Cited in attached European Search Report issued by European Patent Office on Apr. 5, 2012 in connection with European Patent Application No. 1119538.4, which also claims Korean Patent Application Serial No. 10-2010-0133712 as its priority document.

(Continued)

*Primary Examiner* — Twyler Haskins
*Assistant Examiner* — Carramah J Quiett
(74) *Attorney, Agent, or Firm* — H.C. Park & Associates, PLC (57) ABSTRACT

In an image capturing apparatus and a photographing method using the same, the image capturing apparatus comprises: a transparent display panel; and a camera facing a bottom surface of the transparent display panel for synchronizing a shutter time with a period when the transparent display panel displays a black image, and for capturing an image positioned in front of the transparent display panel, thereby capturing a clear image without interference between images due to light-leakage property.

24 Claims, 9 Drawing Sheets

(51) Int. Cl.
*H04N 5/232* (2006.01)
*H04N 5/376* (2011.01)

(58) Field of Classification Search
USPC .................................................... 348/333.08
See application file for complete search history.

(56) References Cited

U.S. PATENT DOCUMENTS

| | | | |
|---|---|---|---|
| 8,624,954 B2* | 1/2014 | Robinson et al. ......... | 348/14.07 |
| 9,099,021 B2* | 8/2015 | Yu ........................... | G03B 17/48 |
| 9,360,602 B2 | 6/2016 | Wakabayashi et al. | |
| 2003/0032213 A1* | 2/2003 | Yonezawa ......... | H01L 27/14609 |
| | | | 438/48 |
| 2005/0024489 A1* | 2/2005 | Fredlund et al. ................ | 348/61 |
| 2007/0002130 A1 | 1/2007 | Hartkop | |
| 2008/0106629 A1 | 5/2008 | Kurtz et al. | |
| 2008/0166022 A1* | 7/2008 | Hildreth ......................... | 382/107 |
| 2009/0278913 A1* | 11/2009 | Rosenfeld et al. ......... | 348/14.16 |
| 2009/0295731 A1 | 12/2009 | Kim et al. | |
| 2009/0295943 A1 | 12/2009 | Kim et al. | |
| 2009/0295976 A1 | 12/2009 | Choi | |
| 2010/0066667 A1* | 3/2010 | MacDougall et al. ......... | 345/156 |
| 2013/0207952 A1* | 8/2013 | Yu ........................... | G03B 17/48 |
| | | | 345/207 |

FOREIGN PATENT DOCUMENTS

| | | |
|---|---|---|
| KR | 10-2004-0010943 | 2/2004 |
| KR | 10-0645699 | 11/2006 |
| KR | 10-2009-0073688 | 7/2009 |
| KR | 10-2009-0124325 | 12/2009 |
| KR | 10-2009-0126141 | 12/2009 |

OTHER PUBLICATIONS

European Search Report issued by European Patent Office on Apr. 5, 2012 in connection with European Patent Application No. 11195382.4, which also claims Korean Patent Application Serial No. 10-2010-0133712 as its priority document.

Korean Office Action dated May 10, 2016 by Korean Intellectual Property Office in connection with Korean Patent Application No. 10-2010-0133712 and Request for Entry attached herewith.

Korean Notice of Allowance dated Jul. 1, 2017 by Korean Intellectual Property Office in connection with Korean Patent Application No. 10-2010-0133712 and Request for Entry attached herewith.

European Search Report dated Jul. 25, 2017 by EPO in connection with Korean Patent Application No. 10-2010-0133712.

Gorrn Patrick et al: "Towards see-through displays: Fully transparent thin-film transistors driving transparent organic light-emitting diodes", EPO Form 2906 01 .91TRI Advanced Mater, Wiley- V C H Verlag Gmbh & Co. KGAA, DE, vol. 18, No. 6, Mar. 17, 2006 (Mar. 17, 2006), pp. 738-741.

* cited by examiner

IMAGE-CAPTURING AND DISPLAY APPARATUS AND PHOTOGRAPHING METHOD USING THE SAME

CLAIM OF PRIORITY

This application makes reference to, incorporates the same herein, and claims all benefits accruing under 35 U.S.C. § 119 from an application for IMAGE CAPTURING APPARATUS AND PHOTOGRAPHING METHOD USING THE SAME earlier filed in the Korean Intellectual Priority Office on 23 Dec. 2010 and there duly assigned Serial No. 10-2010-0133712.

BACKGROUND OF THE INVENTION

Field of the Invention

The present invention relates to image capturing apparatuses and photographing methods using the same.

Description of the Related Art

An image capturing apparatus captures moving pictures and still images, and may use the captured moving pictures and still images in various ways. An image sensor of the image capturing apparatus is fixed to one side of the image capturing apparatus, and an image captured by the image sensor is displayed on a display panel.

Typically, when an image capturing apparatus captures a moving picture or a still image of a subject seen through a transparent display panel, interference between images occurs due to a light-leakage property at a side of a bottom surface of the transparent display panel. Thus, a clear image cannot be captured.

SUMMARY OF THE INVENTION

The present invention provides image capturing apparatuses for capturing a clear image without interference between images due to a light-leakage property.

According to an aspect of the present invention, an image capturing apparatus comprises: a transparent display panel; and a camera facing a bottom surface of the transparent display panel for synchronizing a shutter time with a period when the transparent displays panel display a black image, and for capturing an image positioned in front of the transparent display panel.

The image capturing apparatus may further include a driver for transmitting, to the camera, a control signal for synchronizing the shutter time with the period when the black image is displayed.

The shutter time may be a period when the black image is displayed, or less.

In the period when the black image is displayed, an entire region of the transparent display panel may be in a transmissive state.

The camera may capture the image at a predetermined frequency which is equal to or less than a frame rate of an output image.

A single frame may be divided into a first period in which an entire region of the transparent display panel is in a non-emission state while a data signal is supplied to all pixels, and a second period in which the entire region of the transparent display panel is in an emission state after the data signal is supplied to all the pixels, and the driver may control the transparent display panel to be driven during the first period and the second period.

A single frame may be divided into a first period in which light is sequentially emitted from the transparent display panel when a data signal is supplied to the pixels, and a second period in which an entire region of the transparent display panel is in a non-emission state, and the driver may control the transparent display panel to be driven during the first period and the second period.

The transparent display panel may be a transparent organic light-emitting diode (OLED) display panel.

A dark room may be formed between a bottom surface of the transparent display panel and the camera.

According to another aspect of the present invention, an image capturing apparatus comprises: a transparent display panel; and an image sensor facing a bottom surface of the transparent display panel for synchronizing an image capturing period of time with a period when the transparent display panel displays a black image, and for capturing an image positioned in front of the transparent display panel.

The image capturing period of time may correspond to a shutter time of a camera.

According to another aspect of the present invention, a photographing method using an image capturing apparatus comprises: determining a driving mode of a transparent display panel; and capturing an image positioned in front of the transparent display panel during a shutter time synchronized with a period when the transparent display panel displays a black image according to the driving mode, the image being captured in a camera facing a bottom surface of the transparent display panel.

The determining of the driving mode may include determining whether the transparent display panel operates by simultaneous emission with active voltage (SEAV) driving in which a single frame is divided into a first period in which an entire region of the transparent display panel is in a non-emission state while a data signal is supplied to all pixels, and a second period in which the entire region of the transparent display panel is in an emission state after the data signal is supplied to all the pixels.

The capturing of the image may include capturing the image in the camera during the first period when the transparent display panel operates by SEAV driving.

The determining of the driving mode may include determining whether the transparent display panel operates by progressive emission (PE) driving in which a single frame is divided into a first period in which light is sequentially emitted from the transparent display panel when a data signal is supplied to the pixels, and a second period in which an entire region of the transparent display panel is in a non-emission state.

The capturing of the image may include capturing the image in the camera during the second period when the transparent display panel operates by PE driving.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

The present invention will now be described more fully with reference to the accompanying drawings, in which exemplary embodiments of the invention are shown. Like reference numerals in the drawings denote like elements. In the description of the present invention, certain detailed explanations of related art are omitted when it is deemed that they may unnecessarily obscure the essence of the invention. In the drawings, the thicknesses of layers and regions are exaggerated for clarity. As used herein, the term "and/or" includes any and all combinations of one or more of the associated listed items.

Figure 1:
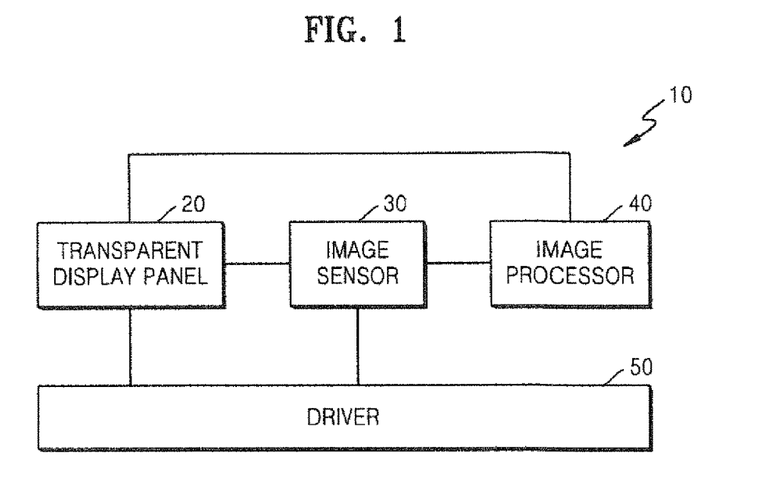
FIG. 1 is a block diagram of an image capturing apparatus according to an embodiment of the present invention.

FIG. 1 is a block diagram of an image capturing apparatus according to an embodiment of the present invention.

Referring to FIG. 1, the image capturing apparatus 10 includes a transparent display panel 20, an image sensor 30, an image processor 40, and a driver 50.

The transparent display panel 20 displays information processed by the image capturing apparatus 10. The transparent display panel 20 displays a captured and/or received image, a user interface (UI), or a graphic user interface (GUI). The transparent display panel 20 includes a transparent organic light-emitting diode (OLED) display panel.

The image sensor (or a photodetector) 30 is an optical device for converting an optical signal into an electrical signal, and captures a still image or a moving picture based on a synchronization signal from the driver 50. The image processor 40 processes an image frame of the still image, the moving picture, or the like, which is captured by the image sensor 30. The processed image frame may be displayed on the transparent display panel 20, and/or may be transmitted out of the image capturing apparatus 10. The image sensor 30 may be embodied as a camera.

The image sensor 30 is disposed at an opposite side (hereinafter, referred to as a bottom surface of the transparent display panel 20) relative to a side of the transparent display panel 20 toward which an image is realized.

The image sensor 30 faces a bottom surface of the transparent display panel 20, and is spaced apart from the center of the bottom surface of the transparent display panel 20 by a predetermined interval. A dark room is formed between the image sensor 30 and the transparent display panel 20. The image sensor 30 captures an image positioned in front of the transparent display panel 20 during a displaying period when an entire portion of the transparent display panel 20 displays a black image.

The driver 50 controls driving of the transparent display panel 20 and the image sensor 30. The driver 50 transmits, to the transparent display panel 20, a driving signal for driving the transparent display panel 20. In addition, the driver 50 transmits to the image sensor 30 a control signal for synchronizing an image capturing period of time when the image sensor 30 captures an image with the displaying period when the transparent display panel 20 displays the black image. When the image sensor 30 is embodied as a camera, the image capturing period of time may be a shutter time. The driver 50 generates a trigger signal as a control signal according to a driving mode of the transparent display panel 20, and transmits the trigger signal to the image sensor 30.

Figure 2:
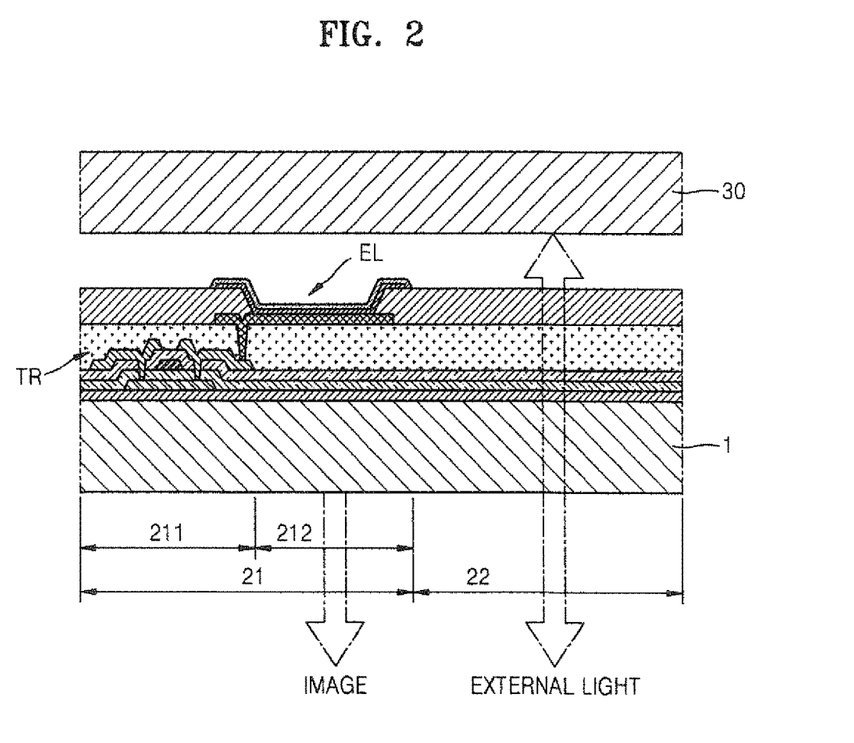
FIG. 2 is a cross-sectional view of a pixel of a transparent display panel according to an embodiment of the present invention.

FIG. 2 is a cross-sectional view of a pixel of a transparent display panel according to an embodiment of the present invention.

Referring to FIG. 2, the pixel of the transparent display panel 20 includes a first region 21 which includes a circuit region 211 and a light-emitting region 212, and which realizes an image, and a second region 22 through which external light is transmitted.

A pixel circuit portion, including a thin film transistor TR, is disposed in the circuit region 211. In FIG. 2, a single thin film transistor TR is disposed on the pixel circuit portion, but the present embodiment is not limited thereto. The pixel circuit portion may further include a plurality of thin film transistors and a plurality of storage capacitors, in addition to the thin film transistor TR, and may further include wirings connected to the thin film transistors and the storage capacitors, such as scan lines, data lines, Vdd lines, and the like.

An organic light-emitting device EL, which is a light-emitting device, is disposed in the light-emitting region 212. The organic light-emitting device EL is electrically connected to the thin film transistor TR of the pixel circuit portion.

Since there are no devices, such as thin film transistors, capacitors, organic light-emitting devices, and the like, in the second region 22, the second region 22 may function as a transmissive window through which external light is transmitted.

An image sensor 30 is disposed at a bottom surface of the transparent display panel 20.

In FIG. 2, the transparent display panel 20 is a bottom emission-type display panel which realizes an image toward a substrate 1, but the present embodiment is not limited thereto. That is, the transparent display panel 20 may be a top emission-type display panel which realizes an image toward an opposite side of the substrate 1. In this case, the image sensor 30 is disposed at the side of the substrate 1.

FIGS. 11A thru 11D show a case where a typical image capturing apparatus captures an image.

Figure 11A:
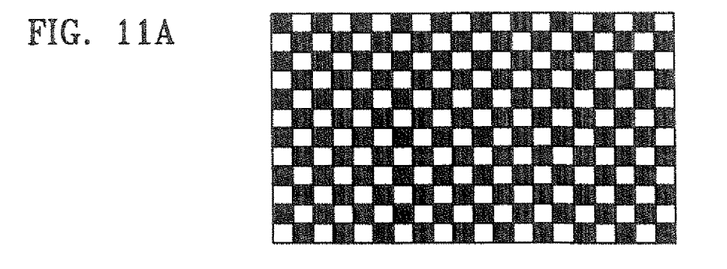
FIGS. 11A thru 11D show a case where a typical image capturing apparatus captures an image.
Figure 11B:
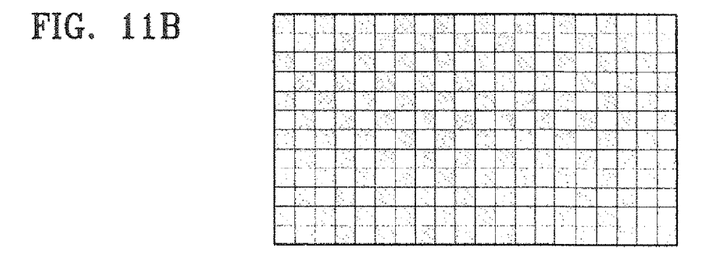
Figure 11C:
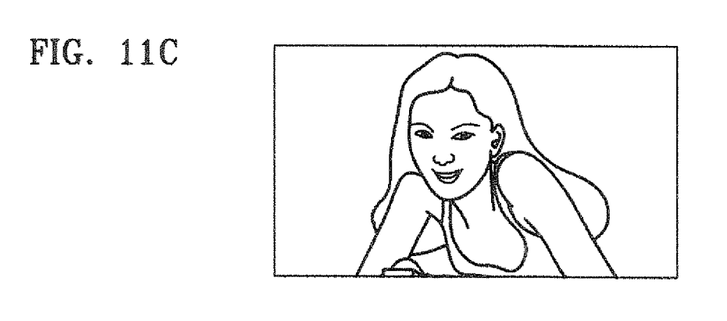
Figure 11D:
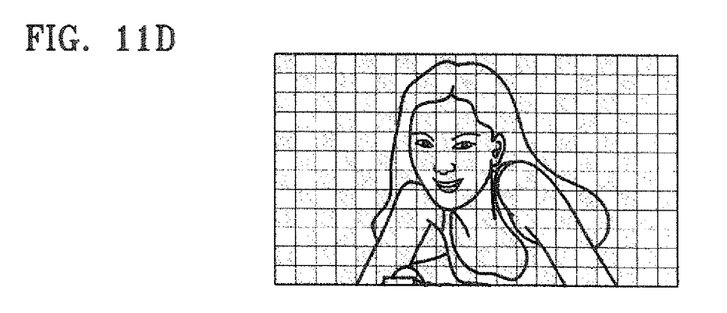

FIG. 11A is an image displayed on the transparent OLED display panel, FIG. 11B is an image (a light-leakage image) seen from a bottom surface of the transparent OLED display panel through a transmissive window, FIG. 11C is an image (a see-through image) of a subject (human or object) facing the transparent OLED display panel, and FIG. 11D is an interference image formed by a light-leakage image of FIG. 11B and a see-through image of FIG. 11C when an image is captured by an image sensor.

The light-leakage property of the transparent OLED display panel is mainly caused because light emitted from an OLED is reflected on interfaces between many thin films due to refractive-power differences between the thin films through which the light passes before the light is transmitted out of a glass surface, and then is transmitted out of the bottom surface of the transparent OLED display panel. The light-leakage image may interfere with a displayed image only in a predetermined region according to a state of the displayed image.

When the interference between images is corrected in terms of software, the time taken to correct the interference is increased as resolution of the images is increased. Thus, it may be difficult to perform smooth video telephony, and there is a limit to correcting the interference in terms of software.

In order to overcome this problem, the driver 50 of FIG. 1 transmits a trigger signal to the image sensor 30 so that the image sensor 30 may capture an image when an entire region of the transparent display panel 20 is in a transmissive state. In this case, the state where the entire region of the transparent display panel 20 is a transmissive state refers to a state where the entire region of the transparent display panel 20 is transparent since the entire region of the transparent display panel 20 does not emit light, and therefore does not display an image, that is, the entire region of the transparent display panel 20 displays a black image.

The image sensor 30 generates a photographing signal (or a photographing synchronization signal) in which an image capturing period of time is synchronized with a period of time in which the entire region of the transparent display panel 20 is in the transmissive state (i.e., a state where the black image is displayed) by the trigger signal, and captures an image.

Figure 3A:
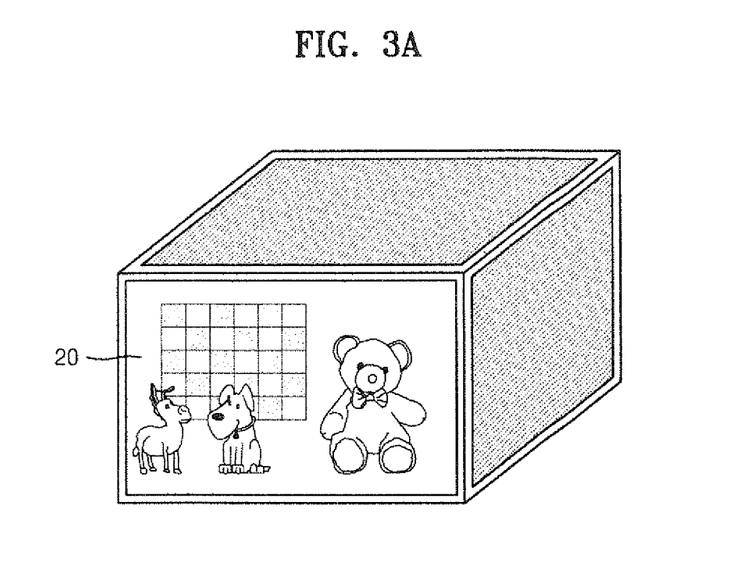
FIGS. 3A and 3B show a state where a mode of the image capturing apparatus of FIG. 1 is changed according to an embodiment of the present invention.
Figure 3B:
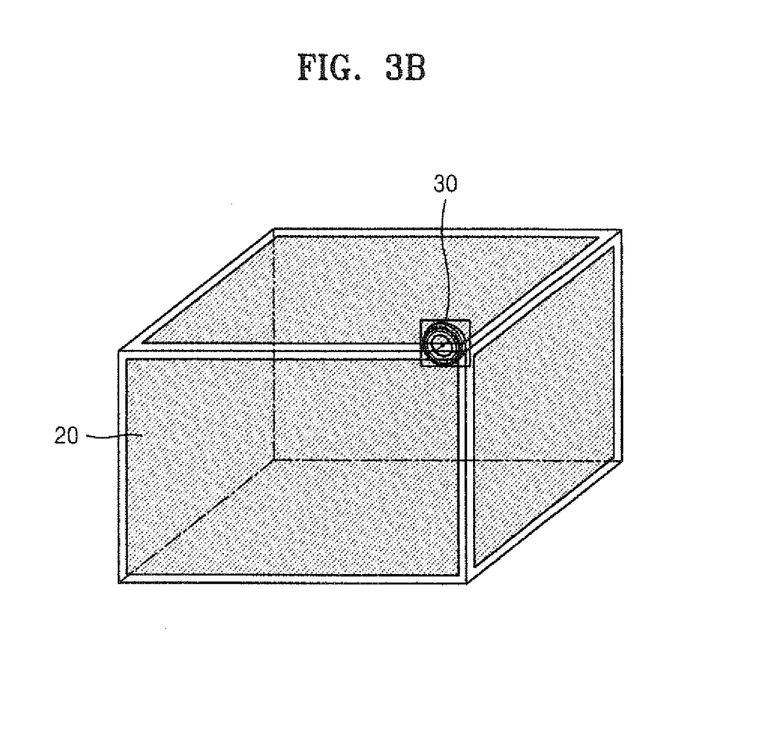

FIGS. 3A and 3B show a state where a mode of the image capturing apparatus of FIG. 1 is changed according to an embodiment of the present invention.

FIG. 3A shows a mode where a transparent display panel displays a general image (a display mode), and FIG. 3B shows a mode where an image capturing apparatus captures an image (a window mode).

Referring to FIG. 3A, in the display mode, the transparent display panel 20 displays a captured image or an image received from the outside by emission of an OLED. In this case, the displayed image may be outputted at a frequency of 60 Hz or more.

Referring to FIG. 3B, in the window mode, the transparent display panel 20 assumes a transmissive state, which is not noticeable by a human's eyes.

The image capturing apparatus 10 controls the transparent display panel 20 so as to repeatedly continue to perform the display mode and the window mode.

In the window mode, the image sensor 30, disposed on the bottom surface of the transparent display panel 20, captures an image positioned in front of the transparent display panel 20 when the entire region of the transparent display panel 20 is in a transmissive state. The image sensor 30 captures an image at a predetermined frequency which is equal to or less than a frame rate of an output image.

Figure 4:
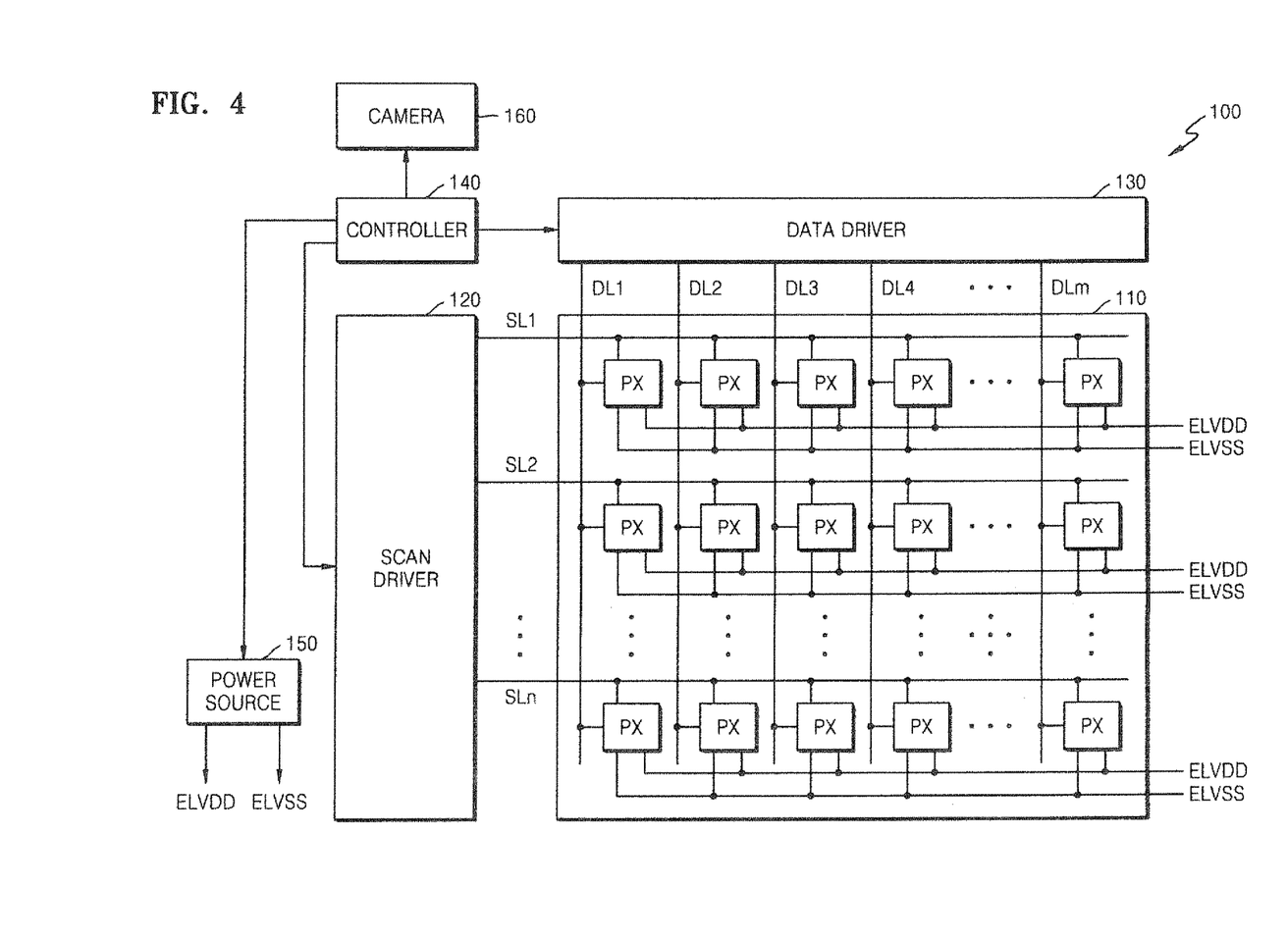
FIG. 4 is a planar conceptual view of an image capturing apparatus according to another embodiment of the present invention.

FIG. 4 is a planar conceptual view of an image capturing apparatus according to another embodiment of the present invention.

Referring to FIG. 4, the image capturing apparatus 100 includes a transparent display panel 110, a scan driver 120, a data driver 130, a controller 140, a power source 150, and a camera 160.

The transparent display panel 110 is a transparent OLED display panel. The transparent display panel 110 includes n×m pixels PXs including an OLED (not shown), n scanning lines SL1 thru SLn formed in a line direction, and m data lines DL1 thru DLm formed in a column direction, and transmitting data signals. The n scanning lines SL1 thru SLn and the m data lines DL1 thru DLm are arranged in a matrix formation. In this case, the pixels PXs are formed at intersections between the n scanning lines SL1 thru SLn and the m data lines DL1 thru DLm, respectively. Each pixel PX makes an OLED emit light by a scan signal, a data signal and a power voltage so as to display an image.

The transparent display panel 110 may operate by simultaneous emission with active voltage (SEAV) driving or progressive emission (PE) driving.

The SEAV driving is a method of dividing a single frame into an emission period and a non-emission period by switching the power voltage applied to the transparent display panel 110 so as to drive the transparent display panel 110.

The PE driving is a method of sequentially making the transparent display panel 110 emit light according to scan signals which are sequentially applied to the transparent display panel 110. In this case, an emission time of the emission period is reduced for each respective frame, and then the non-emission period, when a black image is displayed, is inserted into each frame.

The scan driver 120 is connected to the scanning lines SL1 thru SLn, and sequentially applies a scan signal including a combination of a gate-on voltage and a gate-off voltage, to the pixels PX through the scanning lines SL1 thru SLn, respectively.

The data driver 130 is connected to the data lines DL1 thru DLm, and sequentially applies a data signal to the pixel PX through the data lines DL1 thru DLm when the gate-on voltage is applied to the pixel PX.

The controller 140 generates a scan driving control signal for controlling the scan driver 120, generates a data driving control signal for controlling the data driver 130, and supplies pixel data to the data driver 130. In addition, the controller 140 supplies, to the power source 150, a power control signal for controlling shutting-on or shutting-off of a power voltage applied to the OLED.

The power source 150 applies a first power voltage ELVDD and a second power voltage ELVSS to the OLED of each pixel PX according to the power control signal inputted to the controller 140. The first power voltage ELVDD is a positive voltage, and is electrically connected to a positive electrode of the OLED. The second power voltage ELVSS is a ground voltage or a negative voltage, and is connected to a negative electrode of the OLED.

The camera 160 is disposed at the center of a bottom surface of the transparent display panel 110, and captures an image positioned in front of the transparent display panel 110 when the transparent display panel 110 is in a window mode, that is, when an entire region of the transparent display panel 110 is in a transmissive state (a state where a black image is displayed). The image is captured according to a control signal inputted to the camera 160 from the controller 140. For example, when the transparent display panel 110 operates by SEAV driving, the camera 160 captures the image during a scanning period in which the transparent display panel 110 is in a non-emission state. In addition, when the transparent display panel 110 operates by PE driving, the camera 160 captures the image during the non-emission period inserted next to the emission period. The captured image may be signal-processed by an image processor (not shown), and may be displayed on the transparent display panel 110, or it may be transmitted to the outside.

Figure 5:
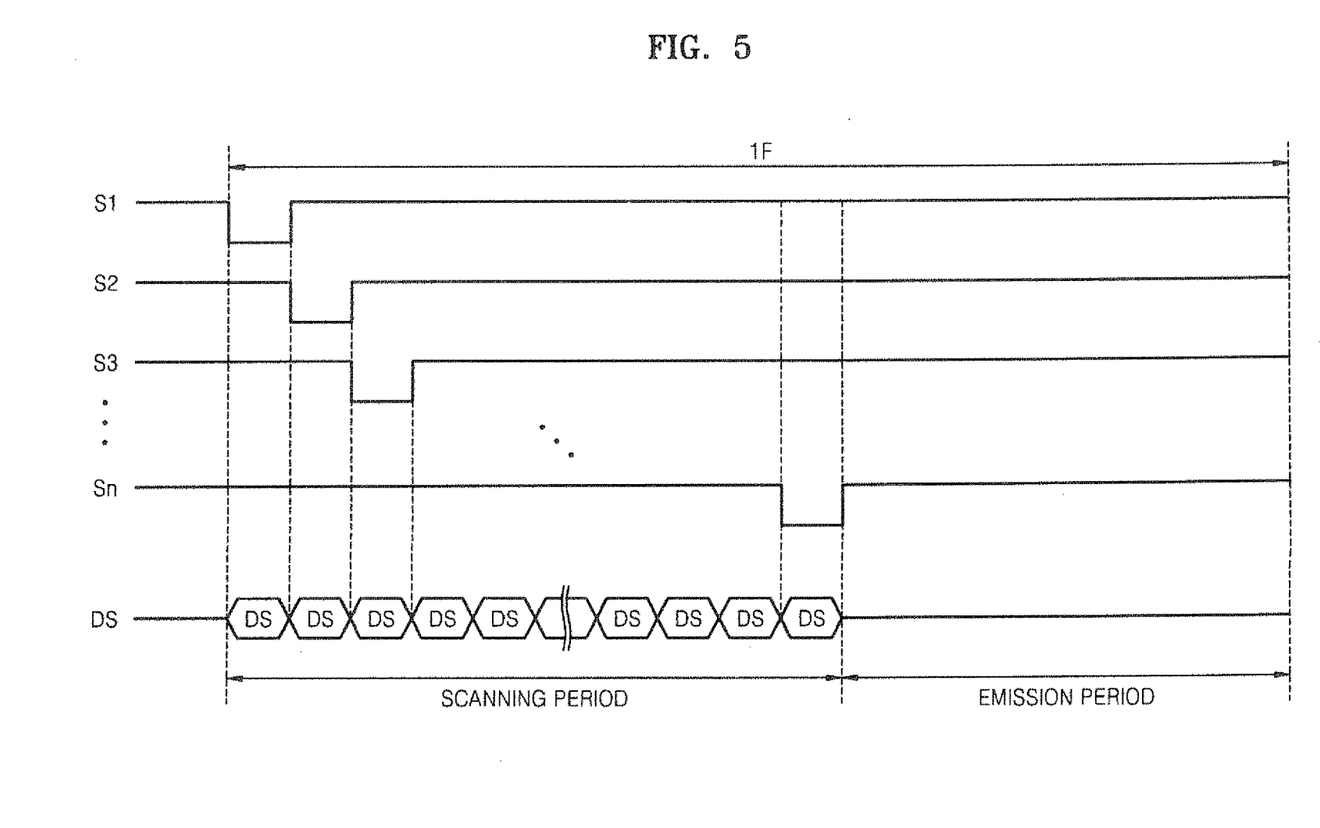
FIG. 5 is a timing diagram for explaining the case where a transparent display panel of the image capturing apparatus of FIG. 4 operates by simultaneous emission with active voltage (SEAV) driving according to an embodiment of the present invention.

FIG. 5 is a timing diagram for explaining the case where the transparent display panel of the image capturing apparatus of FIG. 4 operates by SEAV driving according to an embodiment of the present invention.

Referring to FIG. 5, a single frame (1F) period is divided into a scanning period (or a first period) and an emission period (or a second period).

During the scanning period, the scan driver 120 sequentially supplies scan signals S1 thru Sn to a first scan line SL1 thru an $n^{th}$ scan line SLn. During the scanning period, the data driver 130 supplies a data signal DS to the data lines DL1 thru DLm whenever the scan signals S1 thru Sn are supplied. During the scanning period, all pixels are set to the non-emission state, and the entire region of the transparent display panel 110 displays a black image.

In this case, for example, the power source 150 may set all of the pixels PXs to be in the non-emission state by shutting the driving current supplied to the OLED by switching the first power voltage ELVDD and/or the second power voltage ELVSS.

Then, during the emission period, a driving current corresponding to the data signal DS supplied to each pixel is supplied to the OLED. Thus, during the emission period, the OLED emits light with predetermined brightness, corresponding to the amount of the supplied driving current, for a predetermined period of time, and the transparent display panel 110 displays a predetermined image corresponding to the data signal DS. In this case, all of the pixels PXs emit light, simultaneously.

In the scanning period, when the transparent display panel 110 is in the non-emission state, the camera 160 captures an image positioned in front of the transparent display panel 110.

Figure 6A:
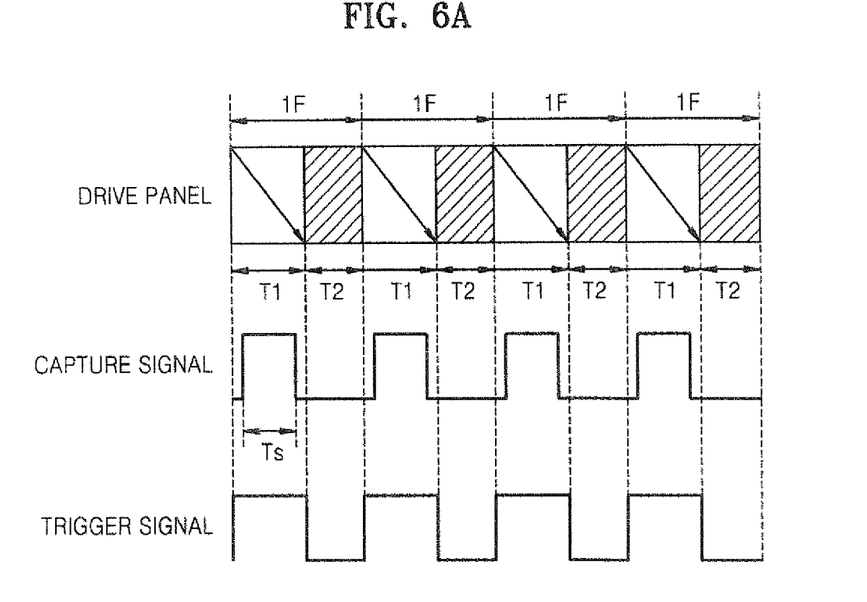
FIGS. 6A and 6B are timing diagrams for explaining the case where the image capturing apparatus of FIG. 4 captures an image according to an embodiment of the present invention.
Figure 6B:
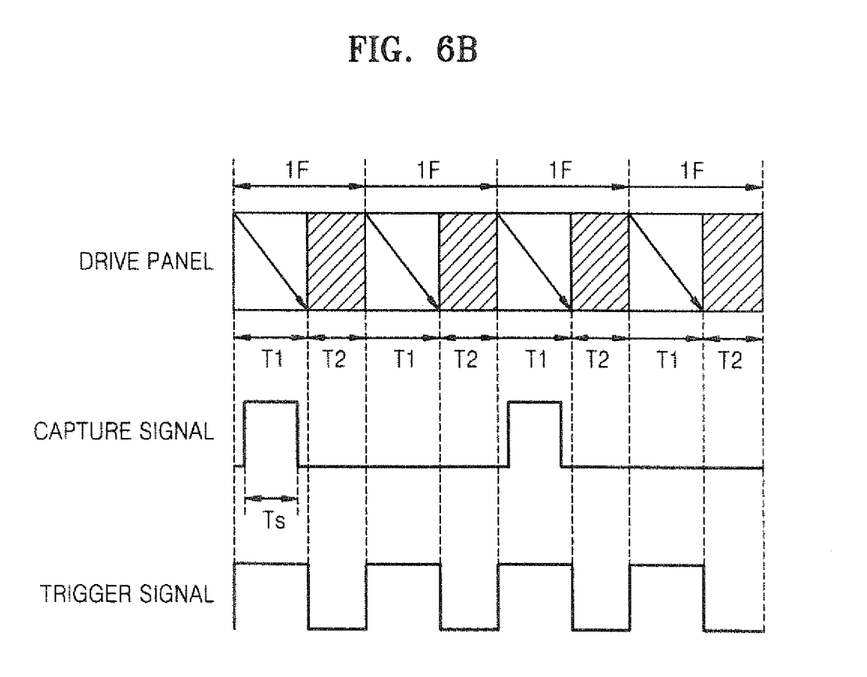

FIGS. 6A and 6B are timing diagrams for explaining the case where the image capturing apparatus of FIG. 4 captures an image according to an embodiment of the present invention.

Referring to FIGS. 6A and 6B, the transparent display panel 110 operates by SEAV driving.

A single frame (1F) period is divided into a scanning period T1 and an emission period T2, and then the transparent display panel 110 is driven.

During the scanning period T1, scan signals are sequentially supplied to the first scan line SL1 thru the $n^{th}$ scan line SLn. During the scanning period T1, whenever the scan signals are supplied, the data signal DS is supplied to the data signals DL1 thru DLm. The scanning period T1 is a period when all of the pixels PXs are in a non-emission state, and the entire region of the transparent display panel 110 displays a black image.

After the data signal DS is supplied to all of the pixels PXs of the first scan line SL1 thru the $n^{th}$ scan line SLn, the entire region of the transparent display panel 110 emits light during the emission period T2.

The controller 140 may periodically generate a trigger signal, and may periodically provide the trigger signal to the camera 160.

The camera 160 generates a capture signal formed by synchronizing a shutter time Ts with the scanning period T1 in connection with a rising time of the trigger signal, and captures an image during the scanning period T1. The camera 160 generates a shutter pulse by selectively setting a predetermined period of time delay from the trigger signal inputted to the camera 160. The camera 160 may set the shutter time Ts by adjusting a duty ratio of the shutter pulse, and the shutter time Ts may be the scanning period T1 or less.

In this case, the camera 160 may generate the shutter pulse so as to capture an image during every frame, as shown in FIG. 6A, or may generate the shutter pulse so as to capture an image during every two frames or more, as shown in FIG. 6B. However, the present embodiment is not limited thereto, and the shutter pulse may be generated at a predetermined frequency which is equal to or less than a frame rate of an output image.

Figure 7:
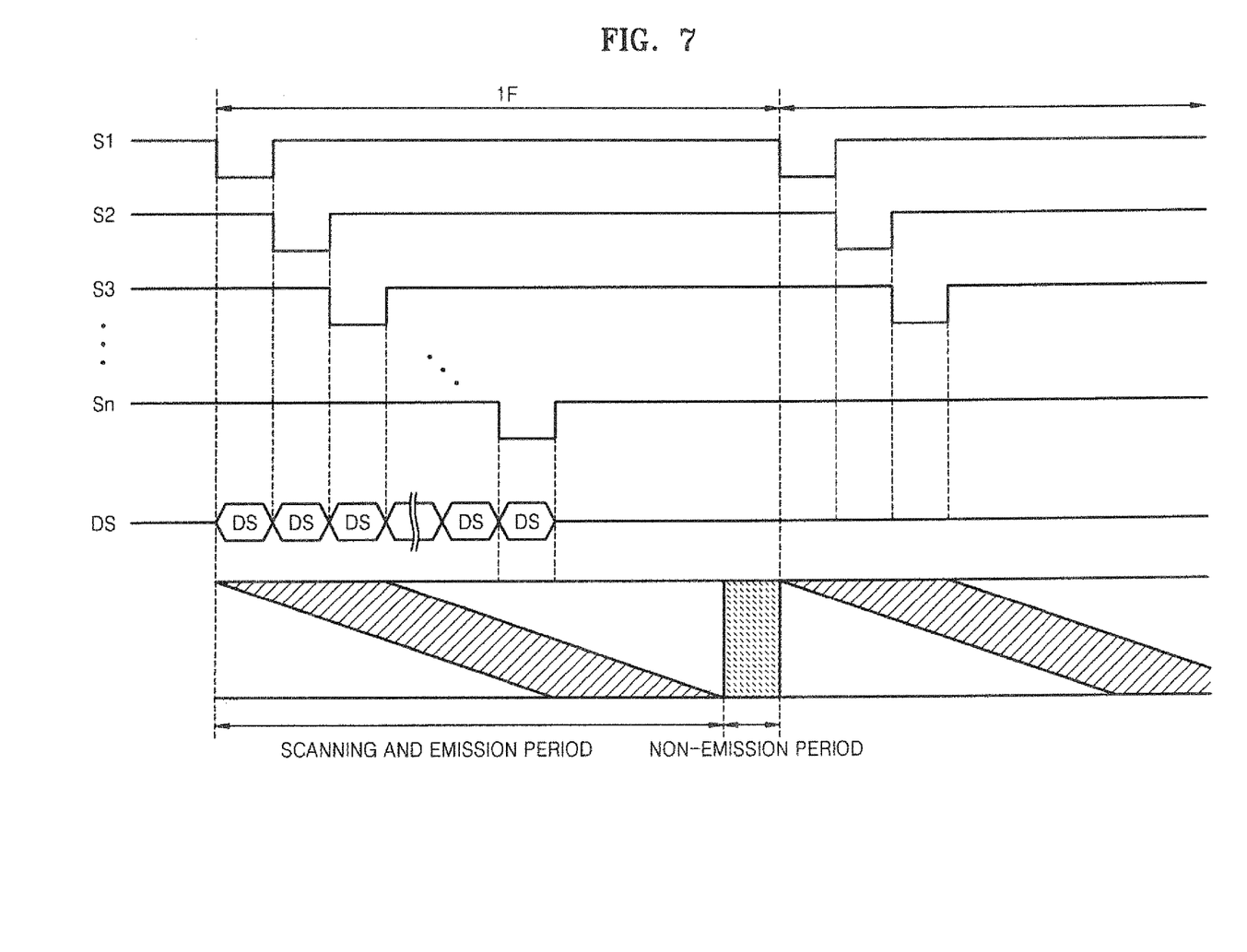
FIG. 7 is a timing diagram for explaining the case where a transparent display panel of the image capturing apparatus of FIG. 4 operates by progressive emission (PE) driving according to another embodiment of the present invention.

FIG. 7 is a timing diagram for explaining the case where the transparent display panel of the image capturing apparatus of FIG. 4 operates by PE driving according to another embodiment of the present invention.

Referring to FIG. 7, a single frame (1F) period is divided into a scanning and emission period (or first period) and a non-emission period (or a second period).

During the scanning and emission period, the scan driver 120 sequentially supplies scan signals S1 thru Sn to a first scan line SL1 thru an $n^{th}$ scan line SLn. During the scanning and emission period, the data driver 130 supplies a data signal DS to the data lines DL1 thru DLm whenever the scan signals S1 thru Sn are supplied. During the scanning and emission period, the pixels PXs receiving the data signal DS supply a driving current corresponding to the data signal DS to the OLED. The OLED of each pixel PX emits light with a predetermined brightness, corresponding to the driving current supplied to the OLED, for a predetermined period of time.

During the non-emission period, all of the pixels are set to a non-emission state, and the entire region of the transparent display panel 110 displays a black image.

In this case, for example, the power source 150 may set all of the pixels PXs to the non-emission state by shutting the driving current supplied to the OLED by switching the first power voltage ELVDD and/or the second power voltage ELVSS.

During the non-emission period, when the entire region of the transparent display panel 110 is in a non-emission state, the camera 160 captures an image positioned in front of the transparent display panel 110.

Figure 10:
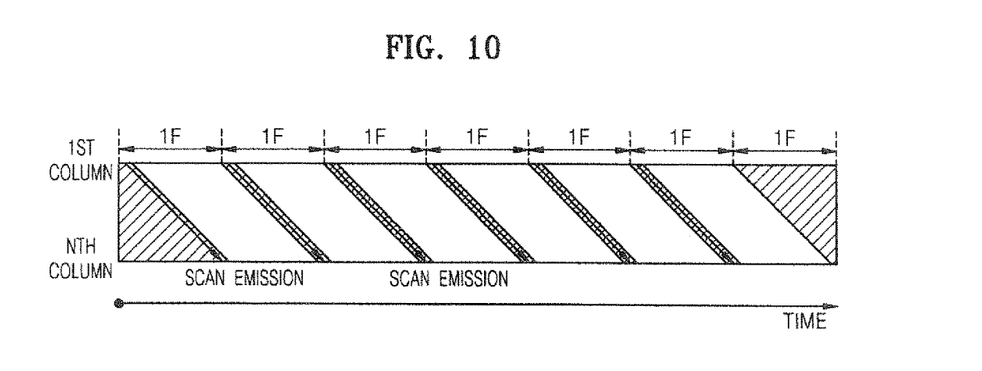
FIG. 10 is a timing diagram for explaining typical PE driving.

In the PE driving according to the present embodiment, the non-emission period is set between the continuous scanning and emission period by reducing an emission period of time in a typical PE driving (see FIG. 10).

Figure 8A:
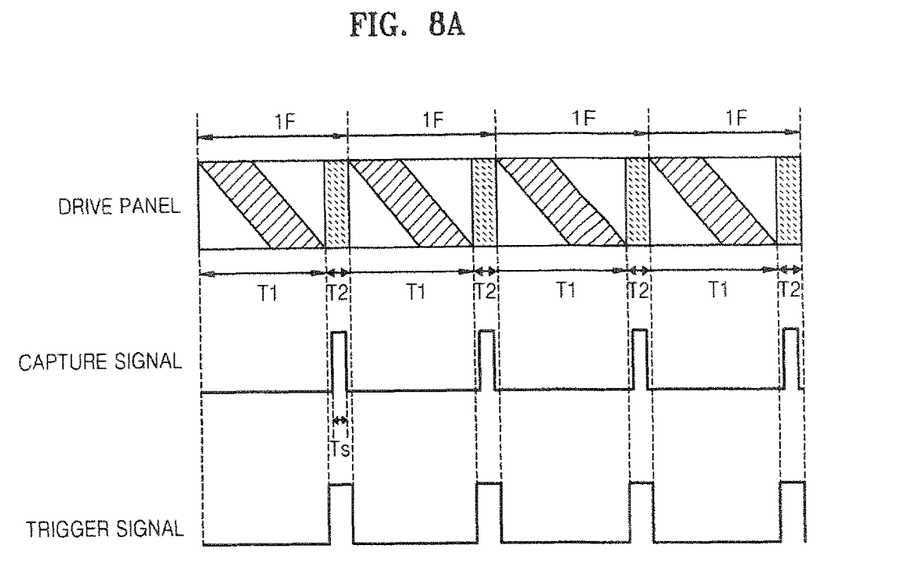
FIGS. 8A and 8B are timing diagrams for explaining the case where the image capturing apparatus of FIG. 4 captures an image according to another embodiment of the present invention.
Figure 8B:
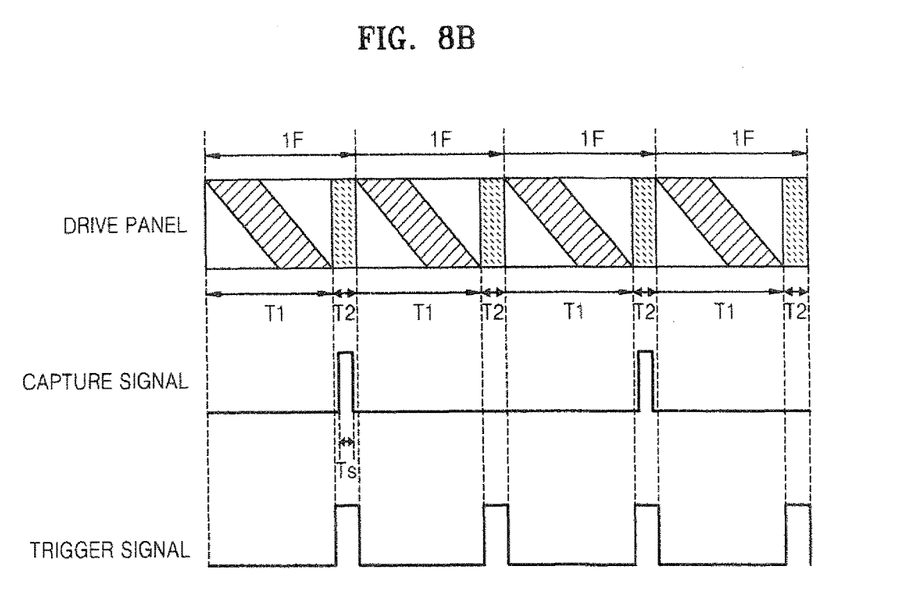

FIGS. 8A and 8B are timing diagrams for explaining the case where the image capturing apparatus of FIG. 4 captures an image according to another embodiment of the present invention.

Referring to FIGS. 8A and 8B, the transparent display panel 110 operates by PE driving.

A single frame (1F) period is divided into a scanning and emission period T1 and a non-emission period T2, and then the transparent display panel 110 is driven.

During the scanning and emission period T1, scan signals S1 thru Sn are sequentially supplied to a first scan line SL1 thru an $n^{th}$ scan line SLn. During the scanning and emission period T1, a data signal DS is supplied to data signals DL1 thru DLm whenever scan signals S1 thru Sn are supplied. The pixels PXs receiving the data signal DS supplies a driving current corresponding to the data signal DS to the OLED. The OLED emits light with a predetermined brightness, corresponding to the driving current supplied to the OLED, for a predetermined period of time.

During the non-emission period T2, all of the pixels are set to a non-emission state, and the entire region of the transparent display panel 110 displays a black image.

The controller 140 may periodically generate a trigger signal, and may periodically provide the trigger signal to the camera 160.

The camera 160 generates a capture signal formed by synchronizing a shutter time Ts with the non-emission period T2 in connection with a rising time of the trigger signal, and captures an image during the non-emission period T2. The camera 160 generates a shutter pulse by selectively setting a predetermined period of time delay from the trigger signal inputted to the camera 160. The camera 160 may set the shutter time Ts by adjusting a duty ratio of the shutter pulse, and the shutter time Ts may be the scanning period T1 or less.

In this case, the camera 160 may generate the shutter pulse so as to capture an image every frame, as shown in FIG. 8A, or it may generate the shutter pulse so as to capture an image every two frames or more, as shown in FIG. 8B. However, the present embodiment is not limited thereto, and the shutter pulse may be generated at a predetermined frequency which is equal to or less than a frame rate of an output image.

Figure 9:
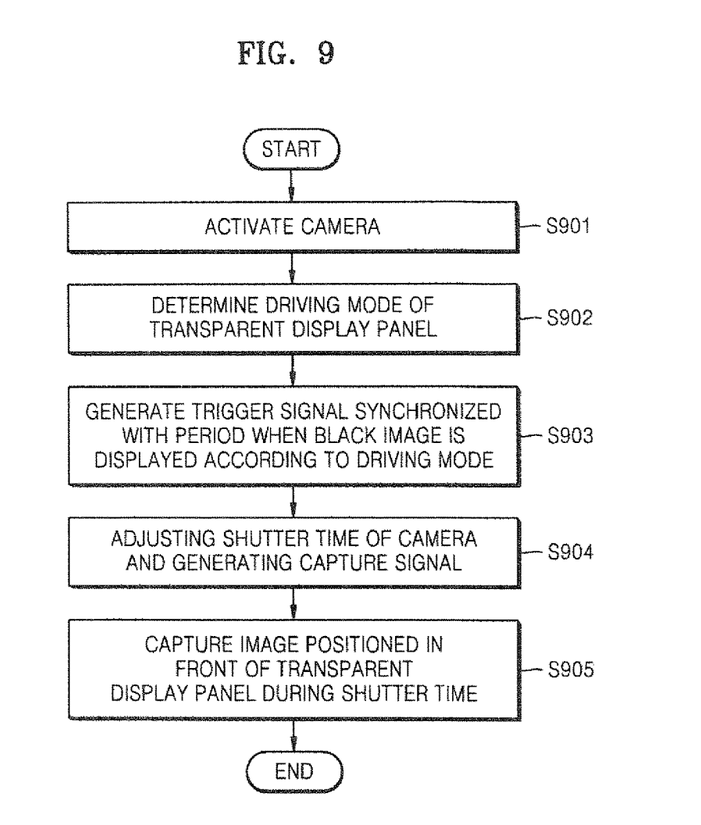
FIG. 9 is a flowchart of a photographing method using an image capturing apparatus according to an embodiment of the present invention.

FIG. 9 is a flowchart of a photographing method using an image capturing apparatus according to an embodiment of the present invention.

Referring to FIG. 9, an image capturing apparatus activates a camera facing a bottom surface of a transparent display panel in order to capture an image (operation S901). The transparent display panel may be a transparent OLED display panel.

The image capturing apparatus determines a driving mode of the transparent display panel (operation S902). For example, the image capturing apparatus determines whether the transparent display panel operates by SEAV driving or PE driving.

The image capturing apparatus generates a trigger signal synchronized with a period when the transparent display panel displays a black image according to a driving mode of the transparent display panel (operation S903).

When the transparent display panel operates by SEAV driving, the period when the black image is displayed corresponds to a scan period. When the transparent display panel operates by PE driving, the period when the black image is displayed corresponds a non-emission period embodied by reducing an emission period time per frame.

The camera receives the trigger signal, and generates a capture signal having a shutter pulse which is delayed from the trigger signal (operation S904). A shutter time of the shutter pulse is synchronized with a period when the black image is displayed. The shutter time may be the period when the black image is displayed, or less. A frequency at which the shutter pulse is outputted may be selectively adjusted.

The camera captures an image positioned in front of the transparent display panel during the shutter time at a predetermined frequency (operation S905).

The image capturing apparatus according to one or more embodiments of the present invention may be used to touch a panel or to recognize a motion. In addition, the image capturing apparatus may be used in, for example, a surface computing system processing captured image data, or video telephony by transmitting a captured image to a video telephone. However, the image capturing apparatus is not limited thereto, and may be used in any apparatus or system which needs to capture an image without interference between images.

According to one or more embodiments of the present invention, the transparent display panel operates by SEAV driving or PE driving, but is not limited thereto. That is, any driving mode in which the entire region of the transparent display panel is in a transmissive state so as to display a black image may be used.

The image capturing apparatus according to one or more embodiments of the present invention may capture a clear image without interference due to light-leakage property by a camera facing a bottom surface of a transparent display panel.

In the drawings, the thicknesses of layers and regions are exaggerated for clarity, and thus are not particularly limited.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. An image capturing apparatus, comprising:
   a transparent display panel including a plurality of pixels of which each pixel comprises;
      a first region which includes a light-emitting device displaying an image, and
      a second region adjacent to the first region and through which external light is transmitted; and
   an image sensor facing a bottom surface of the transparent display panel and synchronizing an image capturing time with a period when an entire region of the transparent display panel is in a transmissive state according to a driving mode, and capturing an image of an object positioned in front of the transparent display panel; and
   wherein the second region of each pixel is absent of any thin film transistors, capacitors, and organic light-emitting devices, the second region functions as a transmissive window through which external light is transmitted.

2. The image capturing apparatus of claim 1, further comprising a driver transmitting to the image sensor a control signal to enable synchronization of the image capturing time with the period when the transparent display panel is in the transmissive state.

3. The image capturing apparatus of claim 1, wherein the driving mode comprises a first period of a frame in which the plurality of pixels are in a non-emission state while a data signal is supplied to all pixels, and a second period of the frame in which the plurality of pixels are simultaneously in an emission state after the data signal is supplied to all pixels.

4. The image capturing apparatus of claim 3 wherein the image capturing time synchronizes with the first period.

5. The image capturing apparatus of claim 3, further comprising a power source shutting a driving current supplied to the light-emitting device of the first region in the first period.

6. The image capturing apparatus of claim 1, wherein the driving mode comprises a first period of a frame in which the plurality of pixels emit light sequentially when a data signal is supplied to the pixels, and a second period in which the plurality of pixels are in a non-emission state after the first period.

7. The image capturing apparatus of claim 6, wherein the image capturing time synchronizes with the second period.

8. The image capturing apparatus of claim 6, further comprising a power source shutting a driving current supplied to the light-emitting device of the first region in the second period.

9. The image capturing apparatus of claim 1, the image capturing time is not greater than the period when the entire region of the transparent display panel is in the transmissive state.

10. The image capturing apparatus of claim 1, the image sensor captures the image at a predetermined frequency which is not greater than a frame rate of an output image.

11. The image capturing apparatus of claim 1, the transparent display panel is a transparent organic light-emitting diode (OLED) display panel.

12. The image capturing apparatus of claim 1, the image sensor is a camera, and the image capturing time corresponds to a shutter time of the camera.

13. The image capturing apparatus of claim 1, wherein the first region further comprises a pixel circuit electrically connected to the light-emitting device.

14. The image capturing apparatus of claim 1, the image sensor is spaced apart from the bottom surface of the transparent display panel by a predetermined distance, and a space from the bottom surface of the transparent display panel to the image sensor is a dark room, and where the dark room is comprised of walls enclosing the space from the bottom surface of the transparent display panel to the image sensor.

15. A photographing method using an image capturing apparatus, the photographing method comprising the steps of:
    determining a driving mode of a transparent display panel including a plurality of pixels of which each pixel comprises:
        a first region which includes a light-emitting device displaying an image, and
        a second region not including a light-emitting device, adjacent to the first region and through which external light is transmitted; and
    capturing an image of an object positioned in front of the transparent display panel during a shutter time, synchronized with a period when an entire region of the transparent display panel is in a transmissive state according to the driving mode, by a camera facing a bottom surface of the transparent display panel
    wherein the second region of each pixel is absent of any thin film transistors, capacitors, and organic light-emitting devices, the second region functions as a transmissive window through which external light is transmitted.

16. The photographing method of claim 15, the shutter time is not greater than the period when the entire region of the transparent display panel is in the transmissive state.

17. The photographing method of claim 15, the camera captures the image at a predetermined frequency which is not greater than a frame rate of an output image.

18. The photographing method of claim 15,
    wherein the driving mode comprises a first period of a frame in which the plurality of pixels are in a non-emission state while a data signal is supplied to all pixels, and a second period of the frame in which the plurality of pixels are in an emission state after the data signal is supplied to all pixels.

19. The photographing method of claim 18, the step of capturing the image comprises capturing the image by the camera during the first period of the frame.

20. The photographing method of claim 18, further comprising shutting a driving current supplied to the light-emitting device of the first region in the first period.

21. The photographing method of claim 15,
    wherein the driving mode comprises a first period of a frame in which the plurality of pixels emit light sequentially when a data signal is supplied to the pixels, and a second period in which the plurality of pixels are in a non-emission state after the first period.

22. The photographing method of claim 21, further comprising shutting a driving current supplied to the light-emitting device of the first region in the second period.

23. The photographing method of claim 21, the step of capturing the image comprises capturing the image by the camera during the second period.

24. The photographing method of claim 15, the transparent display panel is a transparent organic light-emitting diode (OLED) display panel.

* * * * *